United States Patent [19]
Holak et al.

[11] Patent Number: 5,175,555
[45] Date of Patent: Dec. 29, 1992

[54] COMBINED RADAR ALTIMETER, RADIOMETER SENSOR EMPLOYING MULTIPORT FEED HORN HAVING BLENDED SIDEWALL GEOMETRY

[75] Inventors: Larry T. Holak, Palm Bay; Michael J. Lynch, Merritt Island; James Conn, Indialantic, all of Fla.

[73] Assignee: Harris Corporation, Melbourne, Fla.

[21] Appl. No.: 670,317

[22] Filed: Mar. 15, 1991

[51] Int. Cl.⁵ .................................... G01S 13/00
[52] U.S. Cl. ................................ 342/175; 343/772
[58] Field of Search ............... 342/351, 175, 26; 343/772, 703

[56] References Cited

U.S. PATENT DOCUMENTS

| | | | |
|---|---|---|---|
| 3,560,976 | 2/1971 | Foldes | 343/703 |
| 3,599,207 | 8/1971 | Foiani | 342/52 |

Primary Examiner—Mark Hellner
Attorney, Agent, or Firm—Evenson, Wands, Edwards, Lenahan & McKeown

[57] ABSTRACT

A remote sensing apparatus for conducting (spaceborne) measurements of ocean geophysical parameters integrates a radar altimeter subsystem with a radiometer subsystem through the use of a shared antenna feed horn that permits each subsystem to have the same viewing aperture, so that each subsystem sees the same location on the ocean. The horn is a multiport, multifrequency horn having a throat and a tapered sidewall portion extending from the throat to the outer edge of the horn. A first sidewall port is coupled to the transmit/receive channel of the radar altimeter. A second sidewall port is coupled to a first receive channel of the radiometer, and a third sidewall port is coupled to a second receive channel of the radiometer. A throat port is coupled to a third receive channel of the radiometer. The tapered sidewall portion has a first, generally linear shape adjacent to the throat, a second, conic (elliptical) shape at its outer edge, and a third, blending shape disposed between and joining together the generally linear shape and the conic shape at the outer edge. The blending shape is preferably a sinusoidal function and serves to blend the first shape into the second shape in such a manner that the horn presents, over the entirely of the surface of the sidewall portion, an effectively continuous surface to the E plane of an electromagnetic wave emitted or received by the horn. The distance over which the sidewall portion is tapered to effect the blending function is preferably no greater than two wavelengths of the lowest frequency of electromagnetic waves emitted or received by the horn.

32 Claims, 4 Drawing Sheets

COMBINED RADAR ALTIMETER, RADIOMETER SENSOR EMPLOYING MULTIPORT FEED HORN HAVING BLENDED SIDEWALL GEOMETRY

FIELD OF THE INVENTION

The present invention relates in general to remote sensing devices and is particularly directed to a satellite platform-mounted integrated radar altimeter, radiometer system for conducting remote sensing of oceanographic phenomena.

BACKGROUND OF THE INVENTION

Spaceborne remote sensing instruments (e.g. satellite altimeters) are often employed for measuring oceanographic phenomena, such as sea surface elevation, near surface ocean wind speed and wave height. Although an on-board (transmit/receive) radar altimeter is capable of performing distance/height measurements, such measurements are susceptible to atmospheric variations, such as irregularities in the water vapor content in the atmosphere, which affect the propagation delay of the altimeter's radar pulse. To accommodate such variations, the altimeter-derived measurements must be adjusted or 'corrected.'

Currently, there are essentially two mechanisms for providing the necessary modification of the radar return. The first involves correcting the altimeter data based upon a prescribed correction chart or look-up table of adjustment parameters. This method is coarse, however, since it is usually based upon a previously derived average value for the geographical location of interest. A second approach is employ a separate radiometer to measure (in real time) the geophysical parameter of interest (e.g atmospheric water vapor, rain, atmospheric liquid water). Because the principal performance requirement of a radiometer antenna is beam efficiency, while that of the radar altimeter antenna is high gain, each of the two subsystems has its own antenna, with the look aperture of the radiometer antenna being directed off-nadir to a location on the ocean surface that is non-coincident with the measuring location of the radar antenna.

Because of this non-coincidence of the radar antenna and radiometer antenna apertures, the data derived from the radiometer must be subjected to a geo-location algorithm in the course of using the radiometer data to adjust radar altimeter measurements. Thus, the second approach not only increases the amount of spaceborne hardware, but it adds to the computational intensity of the overall distance measurement process and adds measurement accuracy errors.

SUMMARY OF THE INVENTION

In accordance with the present invention, the above-described shortcomings of conventional radar altimeter measurement systems for performing remote measurements of a body of water, including water surface elevation, near water surface wind speed and wave height, are effectively obviated by integrating a radar altimeter subsystem with a radiometer subsystem through the use of a shared antenna feed horn that permits each subsystem to have the same viewing aperture. As in a conventional remote altimeter sensor, the radar altimeter has an (active) transmit and receive channel, while the radiometer unit has a plurality of (passive) receive channels. The antenna is fed by a multiport, multifrequency horn, the viewing aperture of which is shared or common to each of the radar altimeter and the radiometer, so that each subsystem sees the same location of a body of water of interest.

The horn itself is a multiport, multifrequency horn having a throat and a sidewall portion extending from the throat to the outer edge of the horn. A first sidewall port is coupled to the transmit/receive channel of the radar altimeter. A second sidewall port is coupled to a first receive channel of the radiometer, and a third sidewall port is coupled to a second receive channel of the radiometer. A throat port is coupled to a third receive channel of the radiometer.

The tapered sidewall portion has a first, generally linear shape adjacent to the throat, a second, conic (elliptical) shape at its outer edge, and a third, blending shape disposed between and joining together the generally linear shape and the conic shape at the outer edge. The blending shape is preferably a sinusoidal function and serves to blend the first shape into the second shape in such a manner that the horn presents, over the entirely of the surface of the sidewall portion, an effectively continuous surface to the E plane of an electromagnetic wave emitted or received by the horn. The distance over which the sidewall portion is tapered to effect the blending function is preferably no greater than two wavelengths of the lowest frequency of electromagnetic waves emitted or received by the horn.

DETAILED DESCRIPTION

Figure 1:
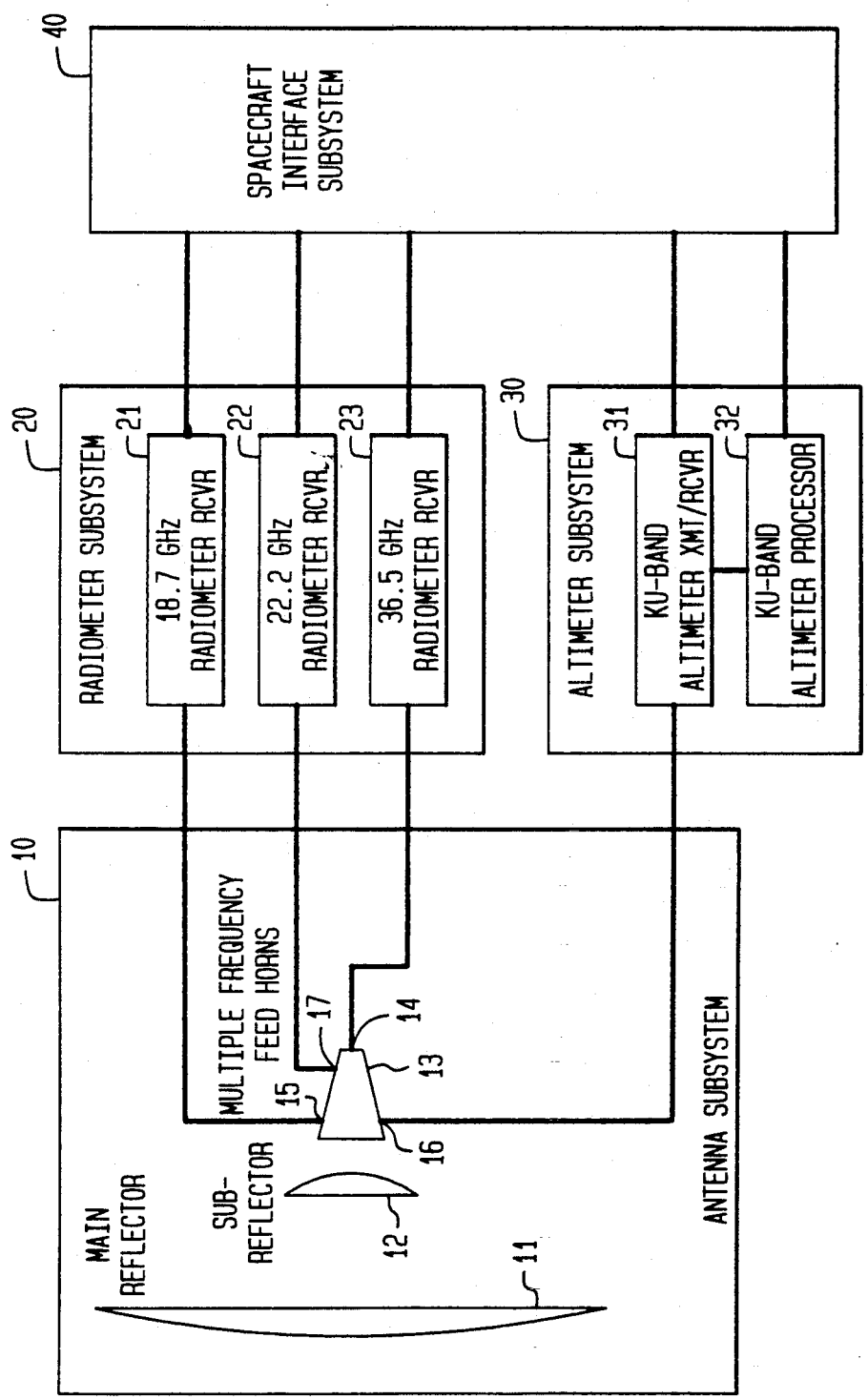
FIG. 1 diagrammatically illustrates the architecture of a remote sensing apparatus of the present invention for conducting remote sensing of oceanographic phenomena.

The architecture of a remote sensing apparatus of the present invention for conducting remote sensing of oceanographic phenomena, such as sea surface elevation, near surface ocean wind speed and wave height, is diagrammatically illustrated in FIG. 1 as comprising an antenna subsystem 10, a radiometer subsystem 20, an altimeter subsystem 30 and a spacecraft interface system 40. Except for the modification of the antenna subsystem 10, to be described in detail below, the remainder of the apparatus, namely, subsystems 20, 30 and 40, are essentially the same as those employed in a conventional, dual subsystem (radar altimeter and radiometer) apparatus, referenced previously, in which an auxiliary radiometer is employed to measure atmospheric water vapor, rain, or atmospheric liquid water, to obtain correction data for the radar altimeter. As a consequence, in the explanation to follow, although the configuration and operation of the overall system will be briefly discussed, the description focus upon the new and improved multifrequency, multiport feed horn for the shared aperture antenna subsystem and the manner in which such a feed facilitates the integration of the altimeter, radiometer measurements by a downlink terrestrial data processing system.

Referring again to FIG. 1, antenna subsystem 10 is shown as having a Cassegrain configuration including a main reflector 11 and a coaxial subreflector 12. It should be noted that while the embodiment shown in FIG. 1 employs a Cassegrain configuration, other antennas could be used, such as, for example, a prime focus fed geometry. Adjacent to subreflector 12 of the Cassegrain arrangement of FIG. 1 is a multiport, multifrequency feed horn 13 which is coupled with each of radiometer subsystem 20 and altimeter subsystem 30, whereby each measurement subsystem has the same viewing aperture. As will be described in detail below with reference to FIGS. 2-7, and as shown diagrammatically in FIG. 1, feed horn 13 has a throat feed port 14 which is coupled to radiometer subsystem 20, and a plurality (three) sidewall feed ports 15, 16 and 17, which are coupled to respective units of the radiometer subsystem and the altimeter subsystem, so that both the radiometer subsystem and the radar altimeter share the same antenna viewing aperture, thereby eliminating the need to subject the output of the radiometer to a geo-location algorithm.

Radiometer subsystem 20 preferably comprises a null-feedback radiometer, in particular, a pulsed, noise-balanced Dicke radiometer containing three low noise single conversion receiver units 21, 22 and 23 operating at respectively different center frequencies, e.g. 18.7 GHz, 22.2 GHz and 36.5 GHz. Altimeter subsystem 30 preferably comprises a single frequency (e.g. transmission center frequency of 13.65 GHz) TOPEX/POSEIDON equivalent instrument made up of a Ku-band transmit/receive unit 31 and an associated Ku-band processor 32. Each of the radiometer subsystem 20 and altimeter subsystem 30 is ported to a spacecraft interface subsystem 40, which handles power, commands and housekeeping telemetry between the system and the spacecraft in a conventional manner.

As pointed out above, in a conventional dual measurement remote sensing system, the radiometer subsystem measures atmospheric water vapor, rain, or atmospheric liquid water, to obtain correction data for the radar altimeter. Unfortunately, because the principal performance requirement of the radiometers antenna is beam efficiency, while that of the radar altimeter antenna is high gain, each of the two subsystems customarily has its own antenna, with the look angle of the radiometer antenna being directed off-nadir to a location on the ocean surface that is non-coincident with the measuring location of the radar antenna. Because of this non-coincidence, the data derived from the radiometer subsystem must be corrected (by a geo-location algorithm) at the downlink terrestrial processor, in the course of its adjustment of radar altimeter measurements to account for propagation delay variations. Thus, such a conventional system imparts additional payload demands (in terms of the separate radiometer antenna) and, because the radiometer's antenna is directed off-nadir, so that the radiometer's field of view sees a different oceanic 'footprint' than the radar altimeter, its output must be subjected to a geo-location algorithm to make each subsystem's data coincident, thereby increasing the computational intensity of the overall oceanographic measurement process and increasing measurement accuracy errors. This dual penalty problem is solved in accordance with the present invention by use of a single multiport, multifrequency feed horn, which is shared by each of the radar altimeter and the radiometer, so that each subsystem shares the same antenna viewing aperture and thereby sees the same location of a body of water of interest.

Figure 2:
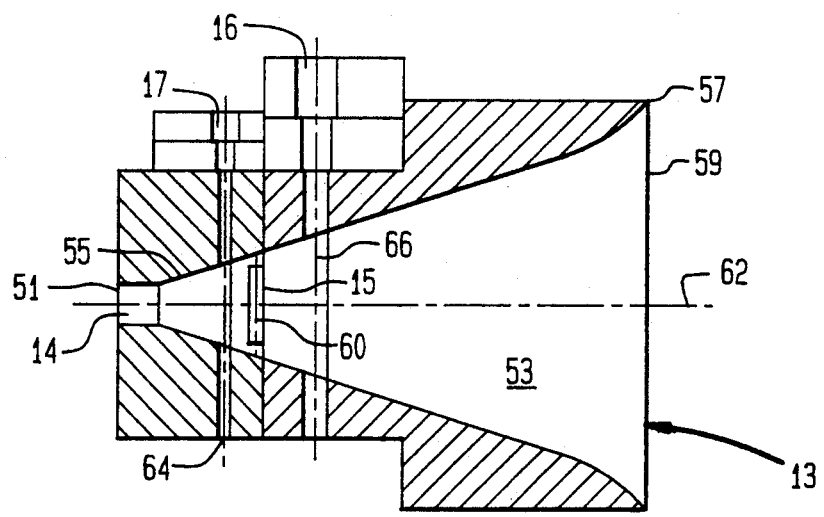
FIG. 2 is a sectional top view of a multifrequency, multiport horn feed employed in the remote sensing apparatus of FIG. 1.
Figure 3:
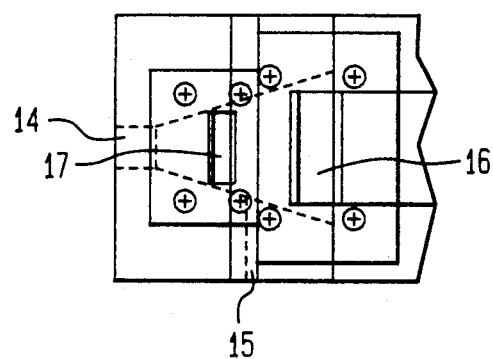
FIG. 3 is a partial right side view of the multifrequency, multiport horn feed of FIG. 2.
Figure 4:
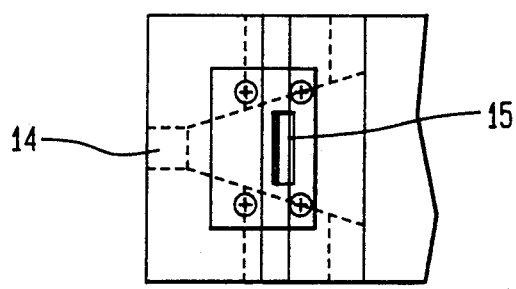
FIG. 4 is a partial left side view of the multifrequency, multiport horn feed of FIG. 2.

The configuration of the multiport, multifrequency feed horn is shown in detail in FIGS. 2, 3 and 4 as comprising a throat section 51 and a diverging sidewall section 53. Throat section 51 has a generally circular cross section capable of supporting a TE11 mode wave and forms throat port 13, which is dimensioned to couple to the 36.56 GHz receive channel of radiometer subsystem 20.

Figure 5:
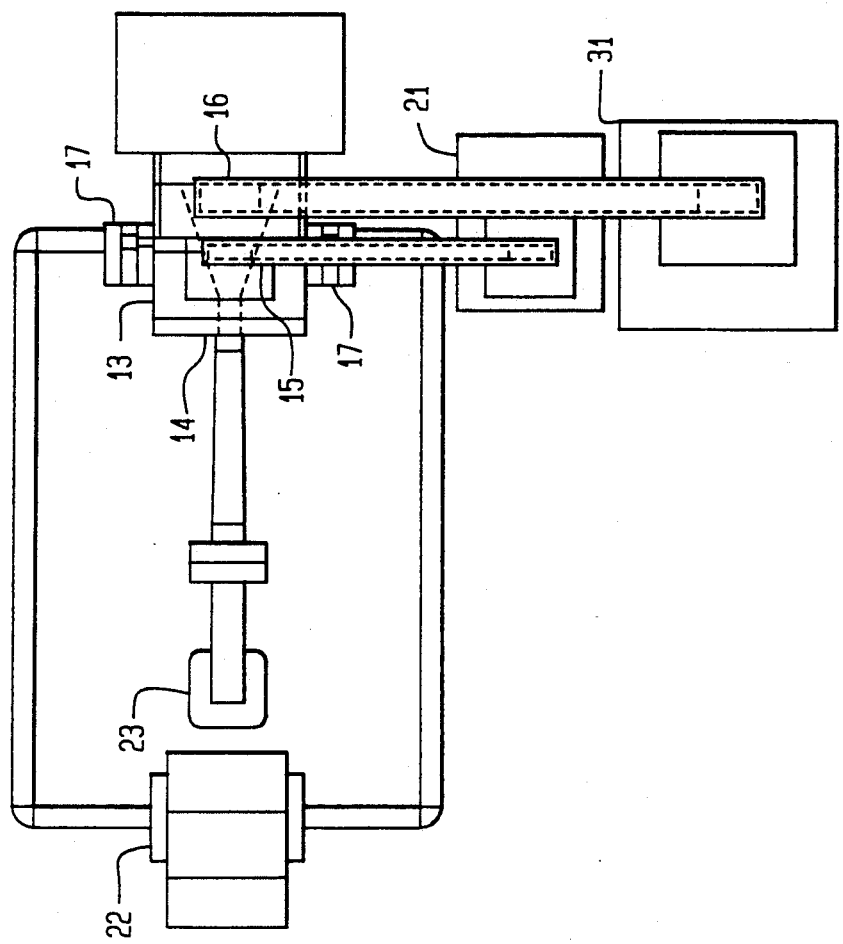
FIGS. 5 and 6 are respective side and end views of the manner of connecting the respective ports of the multifrequency feed horn shown in FIGS. 2-4 to attendant radiometer and radar altimeter units 20 and 30 of FIG. 1.
Figure 6:
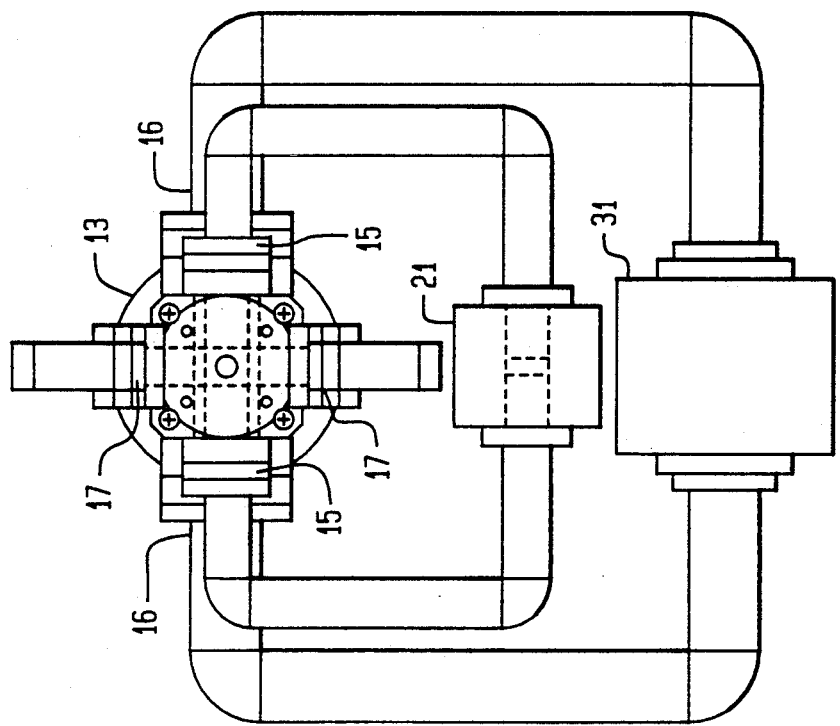

Diverging sidewall section 53 also has a generally circular cross section, a first, narrow end 55 of which is contiguous with throat section 53. Diverging sidewall section 53 diverges from narrow end 55 to an outer edge 57 at the open end of the horn which faces subreflector 12. Diverging sidewall section 53 has a first sidewall port 17, the axis 64 of which is orthogonal to the axis 62 of the horn, coupled to the 22.2 GHz receive channel of radiometer subsystem 20. A second sidewall port 15 has an axis 64 which is orthogonal to both the axis 62 of the horn and the axis 60 of sidewall port 17. Sidewall port 15 is coupled to the 18.7 GHz receive channel of radiometer subsystem 20. Finally, horn 12 has a third sidewall port 16 displaced along the axis 62 of horn 12 from port 17, port 16 being coupled to the 13.5 GHz transmit and channel of radar altimeter subsystem 30. Port 16 has an axis 66 which is orthogonal to both the axis 62 of the horn and the axis 60 of sidewall port 15, and is generally parallel to axis 64 of port 17. The manner in which respective ports 14, 15, 16 and 17 may be coupled to the attendant radiometer and radar altimeter units 20 and 30 of FIG. 1 is shown in FIGS. 5 and 6, which are respective side and end views of the respective waveguide sections interconnecting the respective ports of the feed horn to subsystem measurement units.

To provide isolation among the four separate bands capable of being excited within horn 12, each of sidewall ports 14, 15 and 16 preferably contains a frequency selective filter having its reflection point coincident with the interior sidewall surface of the flared portion of the horn. In addition, the interior surface of the horn may be corrugated and separate polarizations may be employed to ensure isolation among the bands.

As noted earlier, the interior surface contour of horn 12 diverges in a generally linear manner from throat section 51 toward its outer open end 59. In the design of such a horn configuration, it is customary practice to gradually taper or 'roll' the diverging sidewall horn surface in the vicinity of its outer edge, in order to reduce unwanted diffraction effects along this edge. For an exemplary discussion of this technique, attention may be directed to various articles written on the subject including, but not limited to, "An Aperture-Matched Horn Design" by W. D. Burnside et al, IEEE Transactions on Antennas and Propagation, Vol. AP-30, No. 4, July 1982, pp 790-796. Thus, the generally linear contour of the surface of horn 12 is preferably rolled or curvilinearly contoured outwardly in the vicinity of outer edge 57, for example by imparting a conic (e.g. elliptical) shape to the horn surface in this region.

Unfortunately, wherever the surface contour of horn feed changes from a first geometry (e.g. linear divergence) to a second geometry (e.g. conic taper), there is in fact a discontinuity in the sidewall surface, even though the interface of the two contours is visibly smooth, resulting in an unwanted diffracted field.

Pursuant to a further feature of the feed horn of the present invention, this unwanted diffracted field can be substantially eliminated by 'blending' the shape of a prescribed region of the diverging sidewall portion of the horn on either side of the location where it is desired to initiate a transition from one geometrical contour (the linear divergence near the throat of the horn) to a second geometrical contour (the elliptical taper at the outer edge of the horn). In particular, the blending of the two geometries serves to gradually transition the first (linear) region into the second (elliptical) taper region, in such a manner that the horn presents, over the entirely of the surface of its interior sidewall, an effectively continuous surface to the E plane of an electromagnetic wave emitted or received by the horn. The distance over which such blending takes place should is preferably no greater than two wavelengths of the lowest frequency of electromagnetic waves emitted or received by the horn, thereby providing a feed horn that is practically sized as well as functional.

Preferably, the blending mechanism employed is a sinusoidal blending function that has been used to reduce similar discontinuities in reflector designs. For an illustration of the use of rolled edge techniques and the blending of rolled edges in reflector applications, attention may be directed to the articles: "Curved Edge Modification of Compact Range Reflector," by W. D. Burnside et al, IEEE Transactions on Antennas and Propagation, Vol. AP-35, No. 2, February 1987, pp 176–182; "An Improved Main Reflector Design for Compact Range Applications," by C. Pistorius et al, IEEE Transactions on Antennas and Propagation, Vol. AP-35, No. 3, March 1987, pp 342–347; and "Blended Surface Concept for a Compact Range Reflector," by W. D. Burnside et al, AMTA Proceedings, October 1985, pp 10-1-10-10. However, unlike the considerable length of the blending region in a reflector application described in the above literature (typically on the order of six wavelengths or more), the blending region in the horn according to the present invention has a length preferably on the order of one to two wavelengths of the lowest frequency of the waves coupled by the horn, in order to realize a practically sized antenna feed, as noted above.

Figure 7:
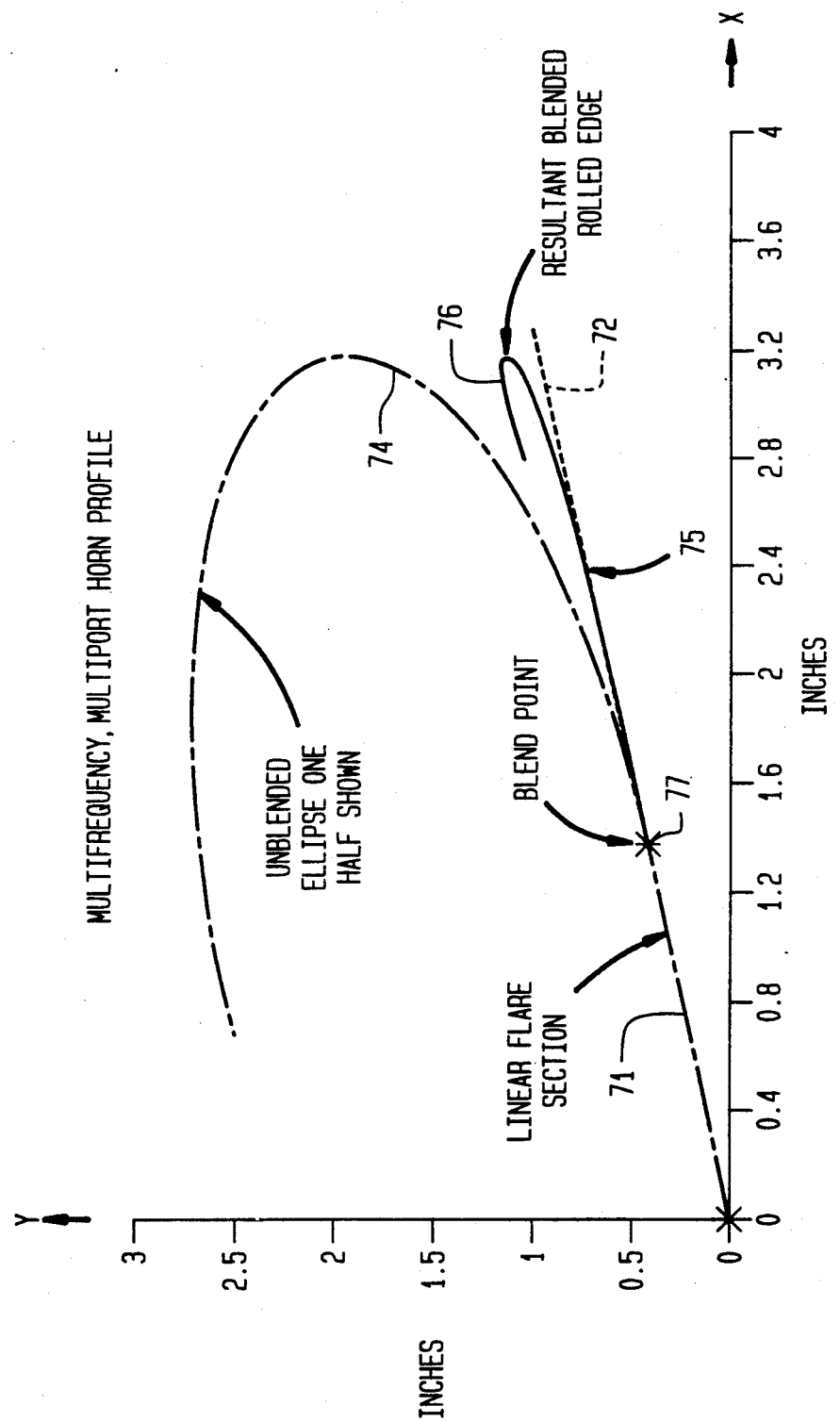
FIG. 7 diagrammatically shows the geometry of a portion of the interior sidewall surface of the feed horn of FIG. 2.

FIG. 7 diagrammatically shows, in broken lines, a portion of the interior sidewall surface of horn 12, beginning as a linearly tapered wall region 71 as it departs from throat 51 and terminating at the open end of the horn as an elliptically tapered wall region 73. Also shown in broken lines at 72 is an imaginary continuation of linearly tapered wall region 71. Shown in dot-dash lines 74 is the true conic perimeter of elliptically tapered wall region 73. Joining these regions is a blending region 75, having a blending curve shown as solid line 76, which is mathematically defined so as to combine, by varying the contribution of, the linear and elliptical shapes into a blending shape as one proceeds outwardly from the linear region 71 to the elliptical region 73. In effect, the blending function operates to produce a surface having a first order derivative (tangent) that very closely approximates the first derivatives of each of the blended shapes over the region of the blend. As a preferred blending function, a sinusoidal blending function, such as described in the above-referenced Burnside et al articles may be employed. For the case of blending linearly sloped, straight wall region 71 to elliptically tapered region 73, the contour BR of curve 76 with blending region 75 may be defined by:

$$BR = [b/2](\text{Linear Surface 71}) + [(1-b)/2](\text{Elliptical Surface 73}),$$

where b is the blending function (e.g. a sinusoidal operator), a value ranging from 1.0 at the interiormost end of the lend region to 0.0 at the outer end of the blend region. The blend region begins at the edge 77 of the forwardmost side port, here the 13.5 GHz feed port.

The geometry of the blended region 75 may be defined as follows. Using cartesian coordinates (x,y) as shown in FIG. 7, the geometry of the flared edge of the horn, i.e. ellipse 74 may be defined as:

$$y = -1((1-(x/b)^2 a^2)^{\frac{1}{2}}$$

The x and y values of a blending ellipse function, at x and y blendpoints, in terms of x',y' coordinates may be defined as:

$$x' = [(x + x\text{offset})\cos(\text{flare angle}) + (y + y\text{offset})\sin(\text{flare angle})] + x_{blendpoint}$$

$$y' = [(y + x\text{offset})\cos(\text{flare angle}) - (x + x\text{offset})\sin(\text{flare angle})] + y_{blendpoint}$$

where the flare angle is the rotation angle from the intersection of the major and minor axes of the ellipse to the point of interest.

For the linear portion of the horn, using x1,y1 to define the horn surface, x1 is greater than or equal to 0 and less than or equal to the horn length. Similarly, y1 is greater than or equal to 0 and less than or equal to the radius of the horn aperture, where (0,0) is located at the vertex of the horn. Thus, $$y1 = ((y_{blend\ point} - y_{vertex})/(x_{blend\ point} - x_{vertex}))x1 + \text{throat radius}.$$

With the vertex of the horn having coordinate values (0,0) and allowing the dimensions to go to zero, y1 can be rewritten as $$y1 = (y_{blend\ point}/x_{blend\ point})x1.$$

From the above relationships, the values $(x_{75}, y_{75})$ of the blending function within region 75 can be defined as:

$$x_{75} = \{y1(1 - [\tfrac{1}{2}][1 - \cos(pi(x_{75} - x_{blendpoint})/T_f)]) + [y'/2][1 - \cos(pi(x_{75} - x_{blendpoint})/T_f)]\},$$

where $T_f$ is the blend period.

For a horn feeding exemplary frequencies of operation described above, the values of a, b and $T_f$ may be set at a=1.1 inches, b=2.2 inches and $T_f$=6.6 inches. Thus, even though the feed is capable of accommodating four different frequencies it is relatively compact, making it practical for spaceborne applications.

As will be appreciated from the foregoing description, shortcomings of conventional radar altimeter measurement systems for performing remote measurements of a body of water, including water surface elevation, near water surface wind speed and wave height, are effectively obviated in accordance with the present invention which successfully combines a radar altimeter subsystem with a radiometer subsystem through the use of a shared multiport, multifrequency feed horn that permits each subsystem to have the same viewing aperture, so that each subsystem sees the same location of a body of water of interest.

What is claimed is:

1. A remote sensing apparatus comprising:
   an antenna unit having a multiport horn;
   a distance measurement device to which said horn is ported;
   a radiometric measurement device to which said horn is ported, and
   wherein said multiport horn has a throat portion and a sidewall portion diverging from said throat portion, said throat portion containing one of the ports of said multiport horn and said sidewall portion containing other ports of said multiport horn.

2. A remote sensing apparatus comprising:
   an antenna unit having a multiport horn;
   a distance measurement device to which said horn is ported;
   a radiometric measurement device to which said horn is ported, and
   wherein said distance measurement device comprises an altimeter device having an electromagnetic energy transmit/receive channel coupled to a first port of said multiport horn, and wherein said radiometric measurement device has a plurality of electromagnetic energy receive channels coupled to a plurality of ports of said multiport horn exclusive of said first port of said multiport horn.

3. A remote sensing apparatus comprising:
   an antenna unit having a multiport horn;
   a distance measurement device to which said horn is ported;
   a radiometric measurement device to which said horn is ported, and
   wherein said multiport horn comprises a multifrequency horn having a first frequency side port coupled to the transmit/receive channel of said altimeter device, a second frequency side port coupled to a first receive channel of said radiometric measurement device, and a third frequency side port coupled to a second receive channel of said radiometric measurement device.

4. A remote sensing apparatus according to claim 3, wherein said multifrequency horn has a fourth frequency throat port coupled to a third receive channel of said radiometric measurement device.

5. A remote sensing apparatus comprising:
   an antenna unit having a multiport horn;
   a distance measurement device to which said horn is ported;
   a radiometric measurement device to which said horn is ported, and
   wherein said multiport horn has a throat portion and a sidewall portion diverging from said throat portion, said sidewall portion having a first shape adjacent to said throat portion, a second shape at an outer edge of said sidewall portion, and a third shape between and joining together said first and second shapes, said third shape blending said first shape into said second shape in such a manner as to present, over the entirely of the surface of said sidewall portion, an effectively continuous surface to the E plane of an electromagnetic wave emitted or received by said horn.

6. A remote sensing apparatus comprising:
   an antenna unit having a multiport horn;
   a distance measurement device to which said horn is ported;
   a radiometric measurement device to which said horn is ported, and
   wherein said multiport horn has a throat portion and a sidewall portion diverging from said throat portion, said diverging sidewall portion tapering from a first geometric function adjacent to said throat portion to a second geometric function at an outer edge of said respective sidewall portion, the tapering of said respective sidewall portion performing a blending of said first geometric function into said second geometric function so as to present an effectively continuous surface to the E plane of an electromagnetic wave emitted or received by said horn.

7. A combined altimeter/radiometer sensor comprising:
   an antenna unit containing a multiport horn having a prescribed electromagnetic energy transmit, receive aperture;
   an altimeter having electromagnetic energy transmit and receive channels coupled to a first port of said multiport horn; and
   a radiometric measurement device having an electromagnetic energy receive channel coupled to a second and a throat port of said multiport horn.

8. A combined altimeter/radiometer sensor according to claim 7, wherein said radiometric measurement device has an electromagnetic energy receive channel coupled to a third port of said multiport horn.

9. A combined altimeter/radiometer according to claim 8, wherein said multiport horn has a throat portion and a sidewall portion diverging from said throat portion, said sidewall portion having a first shape adjacent to said throat portion, a second shape at an outer edge of said sidewall portion, and a third shape between and joining together said first and second shapes, said third shape blending said first shape into said second shape in such a manner as to present, over the entirely of the surface of said respective sidewall portion, an effectively continuous surface to the E plane of an electromagnetic wave emitted or received by said horn.

10. An apparatus for performing remote measurements of a body of water including water surface elevation, near water surface wind speed and wave height comprising:
    an altimeter having electromagnetic energy transmit and receive channels;
    a radiometer having an electromagnetic energy receive channel; and
    an antenna unit containing a multiport horn having a prescribed electromagnetic energy transmit, receive aperture which views a common location of said body of water, said multiport horn having a first port coupled to said electromagnetic energy transmit and receive channels, respectively, of said altimeter, and second and throat ports coupled to said electromagnetic energy receive channel of said radiometer.

11. An apparatus according to claim 10, wherein said multiport horn comprises a multifrequency horn having a first frequency side port coupled to the transmit/receive channel of said altimeter device, a second frequency side port coupled to a first receive channel of said radiometric measurement device, a third frequency side port coupled to a second receive channel of said radiometric measurement device, and a fourth frequency throat port coupled to a third receive channel of said radiometric measurement device.

12. A remote sensing apparatus according to claim 10, wherein said multiport horn has a throat portion and a sidewall portion diverging from said throat portion, said sidewall portion having a first shape adjacent to said throat portion, a second shape at an outer edge of said respective sidewall portion, and a third shape between and joining together said first and second shapes, said third shape blending said first shape into said second shape in such a manner as to present, over the entirely of the surface of said sidewall portion, an effectively continuous surface to the E plane of an electromagnetic wave emitted or received by said horn.

13. A remote sensing apparatus according to claim 10, wherein said multiport horn has a throat portion and a sidewall portion diverging from said throat portion, said sidewall portion tapering from a first geometric function adjacent to said throat portion to a second geometric function at an outer edge of said respective sidewall portion, the tapering of said sidewall portion performing a blending of said first geometric function into said second geometric function so as to present an effectively continuous surface to the E plane of an electromagnetic wave emitted or received by said horn.

14. A remote sensing apparatus according to claim 13, wherein said first geometric function corresponds to a linear function and said second geometric function corresponds to a conic function.

15. A remote sensing apparatus according to claim 13, wherein the tapering of said diverging sidewall portion from said first geometric function to said second geometric function is a sinusoidal function.

16. A remote sensing apparatus according to claim 15, wherein the distance over which said diverging sidewall portion is tapered from said first geometric function to said second geometric function is no greater than two wavelengths of the lowest frequency of electromagnetic waves emitted or received by said multiport horn.

17. A remote sensing apparatus according to claim 15, wherein the distance over which said diverging sidewall portion is tapered from said first geometric function to said second geometric function is between one and two wavelengths of the frequency of an electromagnetic wave emitted or received by said multiport horn.

18. A horn feed for an antenna comprising a throat portion and a sidewall portion diverging from said throat portion, said sidewall portion having a first shape adjacent to said throat portion, a second shape at an outer edge of said sidewall portion, and a third shape between and joining together said first and second shapes, said third shape blending said first shape into said second shape in such a manner as to present, over the entirely of the surface of said sidewall portion, an effectively continuous surface to the E plane of an electromagnetic wave emitted or received by said antenna, each of said first, second and third shapes being respectively different from one another.

19. A horn feed according to claim 18, wherein said sidewall portion tapers from a first geometric function adjacent to said throat portion to a second geometric function at an outer edge of said sidewall portion.

20. A horn feed according to claim 18, wherein said first geometric function corresponds to a linear function and said second geometric function corresponds to a blending of the linear function with a conic function.

21. A horn feed according to claim 18, wherein the tapering of said sidewall portion from said first geometric function to said second geometric function is a sinusoidal function.

22. A horn feed according to claim 19, wherein the distance over which said diverging sidewall portion is tapered from said first geometric function to said second geometric function is no greater than two wavelengths of the lowest frequency of electromagnetic waves emitted or received by said antenna.

23. A horn feed according to claim 19, wherein the distance over which said diverging sidewall portion is tapered from said first geometric function to said second geometric function is between one and two wavelengths of the frequency of an electromagnetic wave emitted or received by said multiport horn.

24. An apparatus for performing remote measurements of a body of water including water surface elevation, near water surface wind speed and wave height comprising:
a radar altimeter having electromagnetic energy transmit and receive channels;
a radiometer unit having a plurality of electromagnetic energy receive channels;
and an antenna unit containing a multiport, multifrequency horn having a prescribed electromagnetic energy transmit, receive aperture which is employed by each of said radar altimeter and said radiometer unit to view a common location of said body of water, said multiport horn having first and second ports coupled to the electromagnetic energy transmit and receive channels, respectively, for a first frequency employed by said radar altimeter, and a plurality of additional ports coupled to said plurality of electromagnetic energy receive channels for a corresponding plurality of frequencies employed by said radiometer.

25. An apparatus according to claim 24, wherein said multiport, multifrequency horn has a throat portion and a sidewall portion diverging from said throat portion, said sidewall portion having a first shape adjacent to said throat portion, a second shape at an outer edge of said respective sidewall portion, and a third shape between and joining together said first and second shapes, said third shape blending said first shape into said second shape in such a manner as to present, over the entirely of the surface of said sidewall portion, an effectively continuous surface to the E plane of an electromagnetic wave emitted or received by said multiport, multifrequency horn.

26. An apparatus according to claim 25, wherein said multiport, multifrequency horn has a first sidewall port coupled to the transmit/receive channel of said radar altimeter, a second sidewall port coupled to a first receive channel of said radiometer, a throat port coupled to a second receive channel of said radiometer, and a throat port coupled to a third receive channel of said radiometer.

27. An apparatus according to claim 26, wherein said radiometer is coupled to said second, third and throat ports of said multiport horn.

28. An apparatus according to claim 25, wherein said multiport, multifrequency horn has a throat portion and a sidewall portion diverging from said throat portion, said sidewall portion tapering from a first geometric function adjacent to said throat portion to a second geometric function at an outer edge of said sidewall portion, the tapering of said respective sidewall portion performing a blending of said first geometric function into said second geometric function so as to present an effectively continuous surface to the E plane of an electromagnetic wave emitted or received by said multiport, multifrequency horn.

29. An apparatus according to claim 28, wherein said first geometric function corresponds to a linear function and said second geometric function corresponds to a blending of said linear function with a conic function.

30. An apparatus according to claim 28, wherein the tapering of said diverging sidewall portion from said first geometric function to said second geometric function is a sinusoidal function.

31. An apparatus according to claim 30, wherein the distance over which said diverging sidewall portion is tapered from said first geometric function to said second geometric function is no greater than two wavelengths of the lowest frequency of electromagnetic waves emitted or received by said multiport, multifrequency horn.

32. An apparatus according to claim 30, wherein the distance over which said diverging sidewall portion is tapered from said first geometric function to said second geometric function is between one and two wavelengths of the frequency of an electromagnetic wave emitted or received by said multiport, multifrequency horn.

* * * * *